A. SÄTTERSTRÖM.
DISTRIBUTING APPARATUS FOR LIQUIDS.
APPLICATION FILED AUG. 17, 1911.
1,038,444.
Patented Sept. 10, 1912.
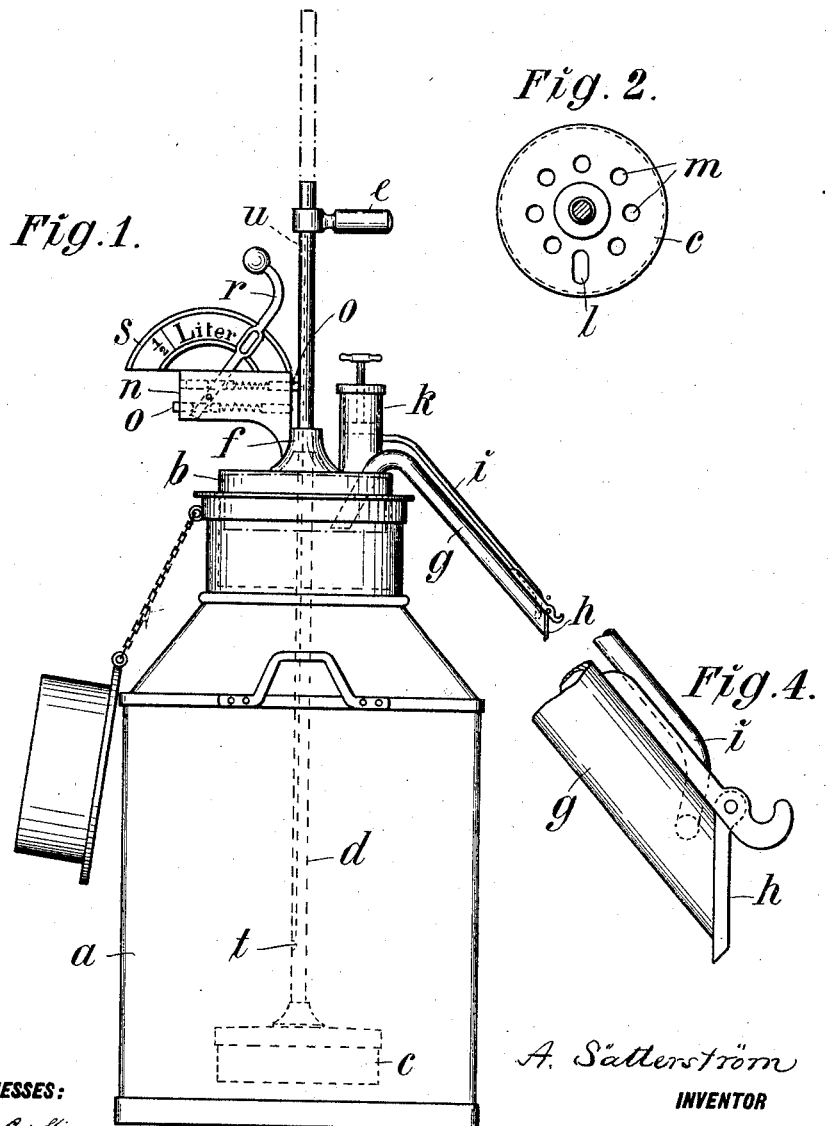

UNITED STATES PATENT OFFICE.

ALGOT SÄTTERSTRÖM, OF GRILLBY, SWEDEN, ASSIGNOR TO GRILLBY METALLFABRIK, OF STOCKHOLM, SWEDEN.

DISTRIBUTING APPARATUS FOR LIQUIDS.

1,038,444.  Specification of Letters Patent.  Patented Sept. 10, 1912.

Application filed August 17, 1911. Serial No. 644,581.

*To all whom it may concern:*

Be it known that I, ALGOT SÄTTERSTRÖM, proprietor, a subject of the King of Sweden, and a citizen of Sweden, residing at Grillby, in the Kingdom of Sweden, have invented certain new and useful Improvements in Distributing Apparatus for Liquids, of which the following is a specification.

The present invention has regard to a distributing apparatus for liquids particularly intended for the distribution of milk in given quantities from ordinary milk cans.

The invention consists, in brief, of a receptacle for drawing up the milk, of any desired size, which is fitted into the milk can in such a way that it can be moved in a vertical direction from the bottom of the can up to one or more given positions. In its upper position this receptacle coöperates with one end opening of a siphon, the other end opening of which is outside the milk can. When the receptacle for drawing up the milk is moved more or less upward and consequently the mouth of the siphon sinks more or less deeply into the liquid in the receptacle a larger or smaller quantity of the liquid will flow out through the siphon into a receptacle outside the milk-can. In order that the liquid may run out through the siphon every time the receptacle is drawn up, the outlet of the siphon is provided with a valve and connected with a pump, by means of which a partial vacuum can be obtained in the outer pipe of the siphon, causing the liquid in the receptacle to flow through the siphon.

One embodiment of the invention is shown on the accompanying drawing, Figure 1. Figs. 2, 3 and 4 show the details, the two latter on an enlarged scale.

—a— is the milk-can and —b— the cover for same.

—c— shows the receptacle for drawing up the milk, arranged in the milk-can, which receptacle can be raised by means of the rod —d— until it enters, the lid —b—. The rod is raised by means of the handle —e—, being guided by means of the guide —f— in the lid.

The lid is penetrated by one branch of the siphon —g— which at its lower end is closed by means of a valve —h— which is preferably merely by its own weight brought to lie against the mouth of the siphon. A tube —i— coming from the air pump —k— projects into the outer branch of the siphon —g—.

When the receptacle for drawing up the milk is raised, the inner mouth of the siphon enters the receptacle through the hole —l—. In order to prevent the liquid from being accidentally splashed out of the receptacle —c— the latter is provided with a cover having a number of openings —m— for the passage of the liquid into the receptacle —c—.

A special arrangement has been made in order to fix the upper position of the receptacle —c— into which the siphon —g— enters through the hole —l—. In the guide-piece —n— fixed to the lid —b— two movable pins —o— have been arranged, which are at one end provided with slots —p— through which passes an arm —r—, which can be rotated over a scale —s—. The pins coöperate with a recess —t— made in the rod —d— situated at the bottom of a groove —u— running along the whole length of the rod, and their relative positions are such that when the upper pin enters the recess —t—, the mouth of the siphon —g—, sinks so deep into the liquid —c— that for example, one liter of the liquid in the receptacle —c—, issues through the siphon. On the other hand, when the arm —r— is turned so that the lower pin enters the recess —t— the receptacle —c— will be given such a position that for example, only half a liter issues through the siphon.

In order that the arm —r— may be able to be given any desired position before the rod —d— is raised the pins —o— are made flexible lengthwise by making them in two pieces between which a spiral spring —v— is inserted.

The apparatus works in the following way: If the receptacle —c— is in an upper position the arm —r— is first given a vertical position, which causes the two pins to assume such a position that, the rod and the receptacle can sink down to their lower position. If one wishes, for example to retail half a liter of the liquid in the can —a—, the arm —r— is placed to the left, causing the lower pin —c— to rest against the bottom of the groove —u— in the rod —d—. The rod is then raised by means of the handle —e— and as the lower pin —o— snaps into the recess —t— the rod is locked in this position. The inner mouth of the siphon —g— is now so far under the surface of the liquid in the receptacle —c— that the quantity of liquid between the said surface and a horizontal plane through the inner mouth of the siphon amounts exactly to half a liter. The valve of the pump —k— is then drawn up, causing a partial vacuum to be formed in the outer branch of the siphon —g—. This causes so much liquid to be sucked into this outer branch that the siphon begins to work and the liquid runs out through the outer branch into a suitable receptacle, until the level of the liquid in the drawing up receptacle —c— has sunk to the inner mouth of the siphon —b—. If it is desired to retail another half a liter it is merely necessary to move the arm —r— to its second position and raise the rod —d— until the upper pin —o— slips into the recess —t—.

What I claim is:—

1. A dispensing apparatus for liquids adapted to be attached to a milk can, comprising a removable lid, a movable receptacle for drawing up the liquids from the can, a siphon attached to said lid, which coöperates with the said receptacle, a pump attached to the lid for creating a vacuum in the siphon, a lifting rod attached to said receptacle and mounted and guided on the lid and means carried by said lip for positively stopping and sustaining the lifting rod at different points.

2. In an apparatus for dispensing liquid, a can, a vertically movable receptacle in said can, a rod attached to the receptacle, and having a recess in its side, pins adapted to alternately engage said recess and sustain the receptacle at different heights, and a pivoted indicating arm engaging said pins.

In testimony whereof I affix my signature in presence of two witnesses.

ALGOT SÄTTERSTRÖM.

Witnesses:
GRETA PRINE,
HARRY ALBIHN.

---

Copies of this patent may be obtained for five cents each, by addressing the "Commissioner of Patents, Washington, D. C."